US007747484B2

(12) United States Patent
Stanley et al.

(10) Patent No.: US 7,747,484 B2
(45) Date of Patent: Jun. 29, 2010

(54) AUTOMATED TAX RETURN WITH UNIVERSAL DATA IMPORT

(75) Inventors: Todd Stanley, San Diego, CA (US); Devin Breise, La Jolla, CA (US); Brian Riggs, San Diego, CA (US); Matthew Rice, Carlsbad, CA (US); Jeffrey Weber, Ramona, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 11/278,945

(22) Filed: Apr. 6, 2006

(65) Prior Publication Data

US 2006/0178961 A1    Aug. 10, 2006

Related U.S. Application Data

(62) Division of application No. 09/935,205, filed on Aug. 21, 2001, now abandoned.

(60) Provisional application No. 60/229,693, filed on Sep. 1, 2000.

(51) Int. Cl.
*G06Q 40/00*    (2006.01)

(52) U.S. Cl. ........................................ 705/31

(58) Field of Classification Search .................. 705/31, 705/35, 36 T, 30
See application file for complete search history.

(56) References Cited

U.S. PATENT DOCUMENTS

| 4,890,228 | A | 12/1989 | Longfield |
| 5,138,549 | A | 8/1992 | Bern |
| 5,193,057 | A | 3/1993 | Longfield |
| 5,644,724 | A | 7/1997 | Cretzler |
| 5,724,523 | A | 3/1998 | Longfield |
| 5,774,872 | A | 6/1998 | Golden et al. |
| 5,875,433 | A | 2/1999 | Francisco et al. |
| 5,909,794 | A | 6/1999 | Molbak et al. |
| 5,963,921 | A | 10/1999 | Longfield |
| 6,032,137 | A | 2/2000 | Ballard |
| 6,202,052 | B1 | 3/2001 | Miller |
| 6,473,741 | B1 | 10/2002 | Baker |
| 6,601,044 | B1 * | 7/2003 | Wallman ............... 705/36 R |
| 6,697,787 | B1 | 2/2004 | Miller |
| 6,823,478 | B1 | 11/2004 | Prologo et al. |

OTHER PUBLICATIONS

"H&R Block and NetZero Offer Consumers Fast, Accurate Online Tax Preparation and Filing"; United Online Press Release, Mar. 28, 2000 (http://www.irconnect.com/untd/pages/news_releases.html?d=16829).

(Continued)

*Primary Examiner*—Hani Kazimi
(74) *Attorney, Agent, or Firm*—Osha • Liang LLP

(57) ABSTRACT

Automated tax return preparation is provided using a relationship-based interview process coupled with universal data import. Information is collected through a process called the interview, during which a taxpayer is asked various questions about her background and relationships with financial institutions. The taxpayer provides to the tax planning software a list of financial institutions with which the taxpayer has a relationship, and the tax software retrieves tax data directly from the financial institutions. The combination of the interview, universal data import, and existing stored data enables an automated tax return system to prepare tax returns in advance with minimal user assistance.

17 Claims, 13 Drawing Sheets

OTHER PUBLICATIONS

"Microsoft and Block Financial Help Consumers Ease the Pain of Tax Season", Microsoft PressPass, Jan. 7, 1988 (http://www.microsoft.com/presspass/press/1998/jan98/kiplngpr.mspx).

Official Action in Application No. 2,420,481, Canadian Intellectual Property Office, May 31, 2006.

*Backup Powers Online Data Protection Service for Quicken TurboTax Users,* Gale Group New Product Announcement, Jan. 17, 2000, p. 1211.

International Search Report from PCT/US01/26182, dated Aug. 21, 2001.

*Internet Access: Intuit to Provide Internet Access Directly from Quicken—Pt 3,* Gale Group Newsletter, vol. 6, No. 283.

Kelley, D., *MacinTax Final Version Releases Earlier Than Ever,* Business Dateline, Jan. 1993.

*Open Financial Exchange,* Specification 2.0, 2000 Intuit, Inc., Microsoft Corp. 537 pages, (Apr. 2000).

Quicken Turbo Tax Deluxe: User's Guide TurboTax Deluxe—Tax Year 1999.

TurboTax: The Easiest Way To Do Your Taxes User's Guide for Windows 95 & Windows 3.1. Tax Year 1995.

\* cited by examiner

Tax Information Details

Wages and Tax: Big Airlines $37,142.07

Select "Import Now" to i

| Wages and Tax:Big |
|---|

Employer Info:
| Employer Federal ID | 21-6000928 |
| Employer name1 | Big Airlines |
| Employer address | P.O. Box 65100 |
| Employer city | Chicago |
| Employer state | IL |
| Employer postal code | 60666 |
| Employer country | USA |

Employee Info:
| Employee SS number | 219-66-6512 |
| Employee name | Kathy L. West |
| Employee address | 12823 University Avenue |
| Employee city | San Diego |
| Employee state | CA |
| Employee postal code | 92124 |
| Employee country | USA |
| Wages, tips, other compe... | 37,142.07 |
| Federal tax withheld | 4,203.37 |
| Social security wages | 39,124.53 |
| Social security tax withheld | 2,425.72 |

Cancel

900

Back

Help

Refund $0

Help

Can I see the details of wh will import?

What if I only want to import some of this information?

After I import my data, can the information?

What if I decide that I don't to import this information?

What if I decide that I don't this information in my retur after I import it?

If I have a large number of transactions to import, car TurboTax still import the di What if I find an error in my imported data?

What if I import a 1099-INT 1099-OID and two worksh are created?

FIG. 9

View Forms EasyStep Tools Online Window Help

EasyStep | 1. Personal Info | 2. Income | ... | $ Refund $0

Form W-2: Wages and Salaries

You have successfully imported the following W-2. Select "Review W-2" to review any of the imported information.

Employee: Kathy L. West
Employer: Big Airlines
Wages/Salaries: $37,142.07
Federal Taxes Withheld: $4,203.37
California Taxes Withheld: $796.54

⟵ 1000

● Back ◀◀    ● Review W-2    ● Continue

Help

Is this all the information that was imported?

How can I see all the information that was imported for this W-2?

Should I review my W-2?

What should I do if the W-2 information I imported appears to be incorrect?

FIG. 10

AUTOMATED TAX RETURN WITH UNIVERSAL DATA IMPORT

CROSS-REFERENCE TO RELATED APPLICATION

This application is a division of U.S. patent application Ser. No. 09/935,205, filed on Aug. 21, 2001, which claims the benefit of U.S. Provisional Application No. 60/229,693 filed Sep. 1, 2000. Each of these applications is incorporated by reference herein in its entirety.

BACKGROUND

1. Field of the Invention

The present invention relates generally to the preparation and filing of tax returns using online and desktop tax preparation and planning software.

2. Description of the Related Art

At present, tax preparation is generally based on a tax form model for collecting information about a taxpayer's income, deductions, and tax credits. Information is solicited from the taxpayer in a way that directly follows the format and sequence of government tax forms such as Internal Revenue Service forms 1040, 1098, 1099, W2, Schedule E, etc. These forms segregate the tax information into tax-oriented categories of taxpayer status, income, wages, deductions, etc. Because taxpayers are generally not accustomed to thinking this way on a day-to-day basis, it is often counterintuitive and hence difficult to provide the information requested. Even once the correct form is known, the data that must be provided is often not easy to determine. For that reason, the process of going through a tax form line by line and entering data can be both arduous and counterintuitive.

In order to avoid the necessity of going to a CPA and having a return professionally prepared, taxpayers have turned in recent years to computer programs designed to assist with tax return preparation. Most tax preparation software follows the "forms" format in an "interview" in which the taxpayer answers questions and inputs data based on the sequence of tax forms. There still remains much of the confusion and difficulty of the tax process for the taxpayer trying to complete her return.

Early attempts at improving tax return preparation focused on importing data from financial management software, such as Quicken™ by Intuit of Mountain View, Calif.; or Money, by Microsoft Corporation of Redmond, Wash. The TaxLink import system found in Intuit's TurboTax product provides one way for users of personal finance applications to import certain data from their financial management software into the tax preparation software. However, the user is required to know from which files to import tax related data, and must manually conduct the transfer. This results in the transfer of data that may not actually be necessary for preparation of the taxpayer's tax return. In addition, the user is required to import the data prior to entering the interview portion of the program.

Accordingly, what is needed is a new way of soliciting information from a taxpayer in order to prepare a tax return, which does not depend on a forms-based interaction in order to allow the taxpayer to provide data in a more intuitive fashion and yet still allow for the effective and accurate preparation of a tax return using tax preparation software.

Another observation that can be made about electronic preparation of tax returns is that while much of the data that must be input into the electronic software is repetitive from year to year—a taxpayer's employer, employer EIN, bank account, etc., typically change little or not at all from year to year—the dollar amounts involved do change regularly. Thus, each new year, and with each new edition of a tax preparation application, this data has to be manually entered. Accordingly, what is needed is a way of remembering information about a user from year to year and importing only changed data electronically, thus reducing the amount of taxpayer information that must be input each year.

Yet another observation that can be made about tax data and preparation of tax returns by a taxpayer is that much of the information that is ultimately needed by the taxpayer for preparation of his return is already stored electronically somewhere outside of the user's reach. For example, information about the taxpayer's wages for the year may be stored electronically by a payroll provider on its local system. At the end of the year, the provider prints a W2 containing all of the taxpayer's earning information for that year, and typically mails the W2 to the taxpayer. When the taxpayer receives the paper W2, he must then enter the data into his tax preparation software. This process is inefficient. Indeed, for taxpayers who have not just one W2, but a large number of forms received every year as the result of multiple relationships with financial institutions, the inefficiency is magnified. Thus, it would be desirable to provide a means by which taxpayers could obtain their taxpayer data from a multitude of tax data providers in electronic form suitable for import into tax preparation software, thus saving them the overhead of having to re-input the data by hand into electronic tax preparation software.

Referring now to FIG. 1, there is shown an illustration of a conventional method of tax return preparation using tax preparation software. At the beginning of the interview 101, the user has the opportunity to import data 102. This is typically an all-or-nothing type import, e.g. import all available data from Quicken, or none at all. Once data has been imported, the forms-based interview 104 begins. First, the taxpayer is asked to define 106 his status, e.g. single, married filing jointly, etc. Next, the taxpayer uses his W2 116 to enter information about his wages 108. Similarly, Form 1099 118 contains information the user must enter for the income section 110, and other forms such as Schedule K-1 must also be entered where necessary. The user also enters information about itemized deductions 112, etc. All of this information must be manually entered by the user. Finally, the conventional process ends with the software preparing a tax return document 114.

SUMMARY

In accordance with the present invention, there is provided a system and method for automated tax return preparation, using a relationship-based interview process coupled with universal data import (UDI).

A taxpayer maintains a plurality of relationships with a plurality of financial institutions. A financial institution is any entity that provides tax information about taxpayers, and a taxpayer has a relationship with a financial institution if the financial institution provides tax data about that taxpayer. The present invention includes an interview process that solicits data from the taxpayer by inquiring about the taxpayer's relationships with financial institutions, and not merely asking forms-based questions that simply track the layout of IRS tax forms.

There are many ways in which taxpayers can receive tax data. For example, in one embodiment, the taxpayer provides to the tax planning software a list of financial institutions with which she has a relationship, and the tax software retrieves information directly from the financial institution. In one embodiment, the taxpayer selects the financial institutions from a list provided by the software. In alternative embodiments, the taxpayer provides unique identifying information about the financial institution, such as an employer identification number (EIN), in the case of a payroll provider, or such other equivalent identifiers as may be appropriate for different types of financial institutions. The tax planning software determines whether the financial institution associated with the identifying information is able to provide tax data related to the taxpayer. If so, then the tax planning software retrieves that data and uses it to prepare a tax return.

Data is imported using universal data import. UDI enables the seamless import of tax data from a variety of import sources into tax preparation software. Import sources include financial institutions, financial management software programs, other tax preparation software, and the like. In one embodiment, data to be imported is provided by the import sources in the format of an inherent data structure. A forms mapping language maps the data of the inherent data structure to various forms and fields in order to prepare a taxpayer's return. Imported data is checked automatically for completeness, and in one embodiment, only data that is missing or incomplete is flagged for the user's attention before an initial tax return is prepared. UDI enables a just-in-time style import whereby data can be imported throughout the interview by connecting to financial institutions on an as-needed basis to obtain the data, instead of only at the beginning or end of the tax preparation process.

Information about taxpayers, including their taxpayer status and their relationships with financial institutions, is stored and used to create a profile for each taxpayer. A taxpayer profile enables a system of the present invention to streamline the tax preparation process for returning taxpayers by asking fewer questions each year, instead of requiring the taxpayer to reenter data that has not varied. A summary of skipped topics is provided to the taxpayer to ensure that no data has been inadvertently omitted. For new users, default profiles are used initially to focus the interview according to the most likely areas of relevance to a particular taxpayer based on the taxpayer's status, including her age, marital status, employment etc., while at the same time ensuring that accurate returns are prepared for all taxpayers, including those taxpayers that do not fit a standard profile.

The availability of taxpayer data through UDI and the stored taxpayer responses gathered during the interview process enable the present invention to provide for the automatic preparation of tax returns on an ongoing basis. In one embodiment, tax data is automatically imported from financial institutions and an initial return is prepared without user intervention. The taxpayer is notified that an initial return is available for review, and the taxpayer then accesses the prepared return and makes any necessary changes before filing the return with a tax authority.

BRIEF DESCRIPTION OF THE DRAWINGS

The foregoing and other aspects of the invention will next be described with reference to the attached drawing figures, in which:

FIGS. 5-10 are screen shots illustrating import of tax information in accordance with an embodiment of the present invention.

DETAILED DESCRIPTION OF THE PREFERRED EMBODIMENTS

In the discussion set forth below, for purposes of explanation, specific details are set forth in order to provide a thorough understanding of the invention. It will be appreciated by those skilled in the art that the present invention may be practiced without these specific details. In particular, those skilled in the art will appreciate that the methods described herein can be implemented in devices, systems and software other than the examples set forth. In other instances, conventional or otherwise well-known structures, devices, methods and techniques are referred to schematically or shown in block diagram form in order to facilitate description of the present invention.

The present invention includes steps that may be embodied in machine-executable software instructions, and includes method steps that are implemented as a result of one or more processors executing such instructions. In other embodiments, hardware elements may be employed in place of, or in combination with, software instructions to implement the present invention.

Overview

Figure 2:
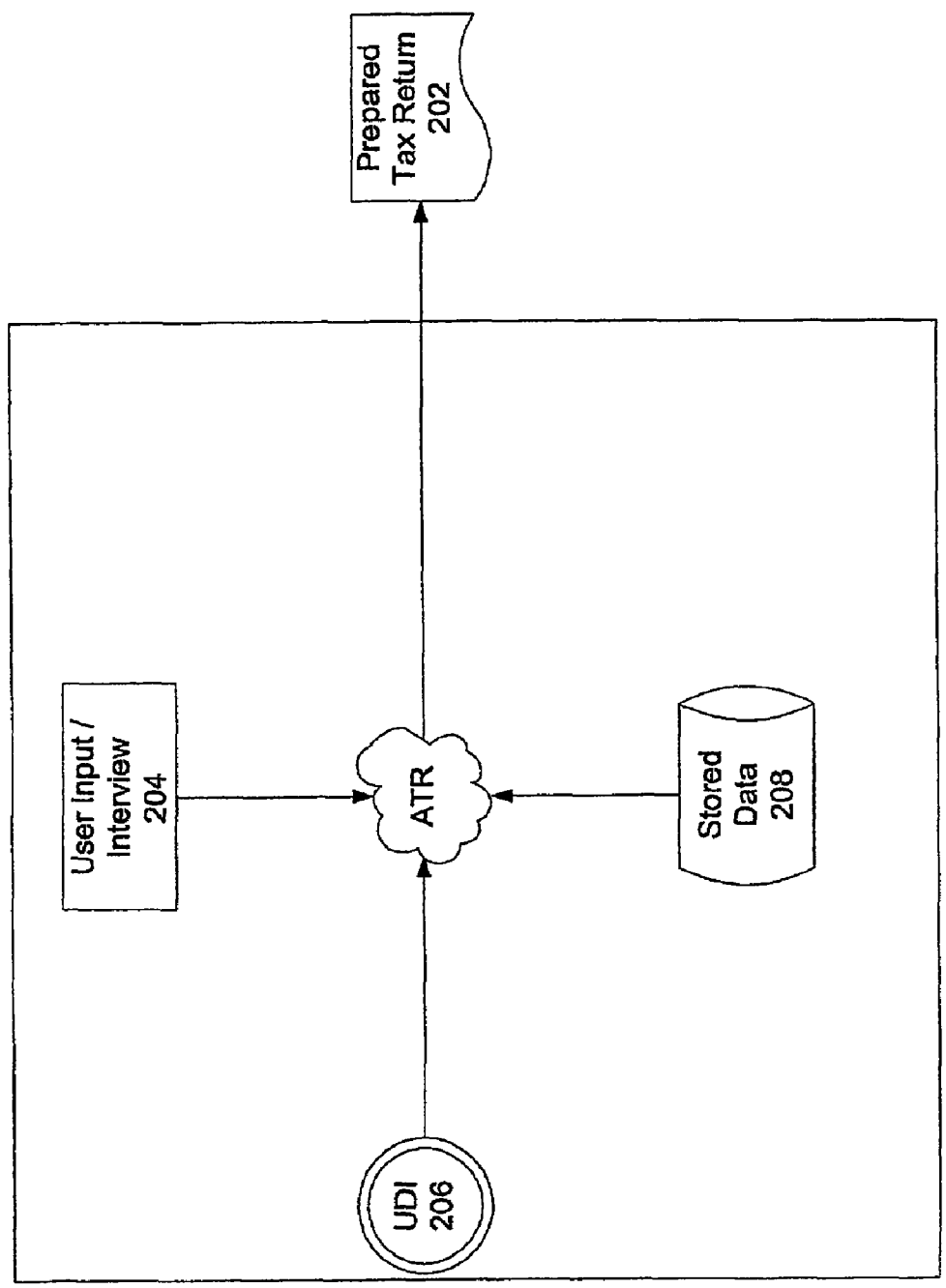
FIG. 2 depicts an Automated Tax Return system in accordance with an embodiment of the present invention.

Referring now to FIG. 2, there is shown an illustration of the Automated Tax Return (ATR) system. Ultimately, the taxpayer wants a prepared tax return 202 that she can submit to a taxing authority, such as the Internal Revenue Service in the United States, or to other various national, state and local governments throughout the world. ATR synthesizes data about the taxpayer from three primary sources: 1) the taxpayer herself; 2) import sources such as financial institutions; and 3) information already stored, whatever the original source. Data is obtained from the taxpayer herself through direct user input 204. In a preferred embodiment, this direct user input is solicited through a process called an "interview." Second, through a process called Universal Data Import (UDI) 206, data is imported over a communications network seamlessly from a variety of sources such as banks, brokerage houses, mortgage lenders, payroll processors, and the like, and from financial management software. Finally, information obtained previously 208, i.e. for preparation of documents such as prior year returns, or obtained over the course of the tax year, is accessed by the ATR process in order to avoid asking the taxpayer the same questions repeatedly.

Figure 3:
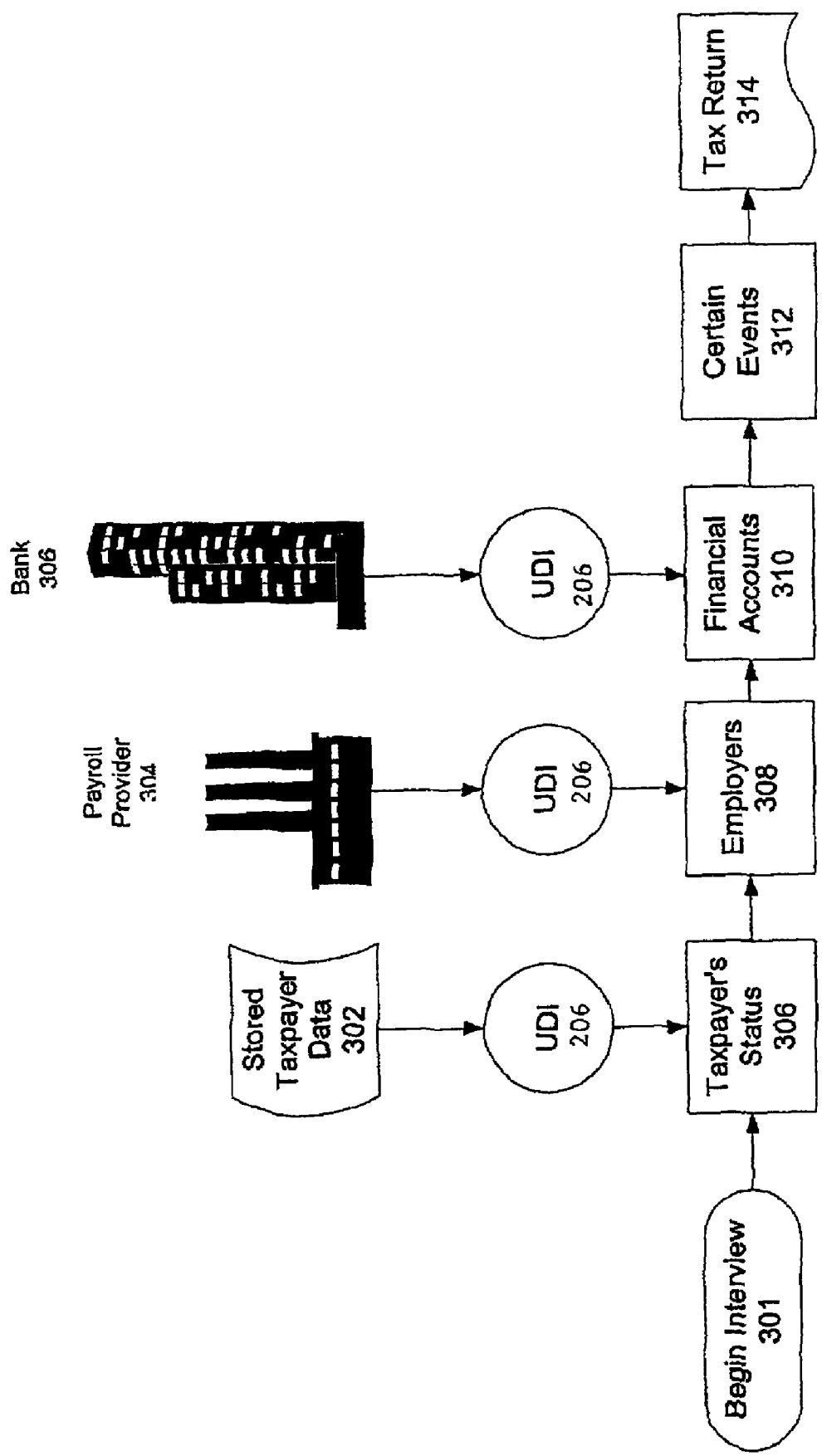
FIG. 3 depicts a method for preparation of a tax return in accordance with an embodiment of the present invention.

Referring now to FIG. 3, there is shown an overview of a process for preparing a tax return in accordance with the present invention. The interview begins 301 in a preferred embodiment not with an all-or-nothing style of import, but by asking questions about the taxpayer's status 306, e.g. "Are you married," in order to determine what kind of return should be prepared. Stored data 302 is imported via UDI 206, so that the taxpayer can rely on information already stored elsewhere, e.g. in Quicken. Next, rather than asking the user for his W2 information, she is asked to identify her employer. Using UDI 206, this allows W2 information to be automatically downloaded from the user's employer or payroll provider 304. Similarly, the user enters basic information about her financial accounts 310, e.g. where she has a bank or brokerage account, and Form 1099 information is automatically obtained from the bank or brokerage house 306. Next, the user is asked whether certain events have taken place during the year 312, e.g. "did you move your primary residence this year?" The answers to these questions are mapped to appropriate parts of the user's tax return, e.g. Schedule A (Itemized Deductions), as needed. Finally, a tax return 314 is prepared based on the user's answers during the interview and the imported data.

Figure 1:
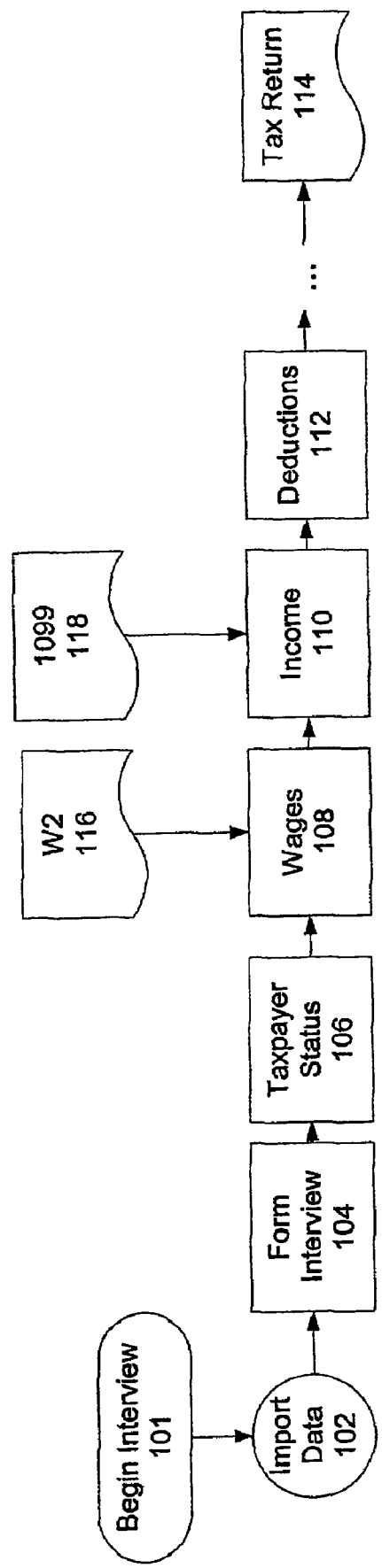
FIG. 1 illustrates a conventional method of tax return preparation.

It will be appreciated that the process just described with respect to FIG. 3 is quite different from the conventional process described with respect to FIG. 1. For example, the process just described asks the user questions that relate to the taxpayer's relationships with employers, banks, brokerage houses, mortgage lenders, etc., as opposed to tax form specific questions. Thus, for example, instead of providing W2 information line by line, the user simply identifies his employer, and the appropriate data is located and imported. The user is asked relationship-specific questions that are easily answered, as opposed to more esoteric forms-oriented questions used conventionally.

System Architecture

Tax return preparation software exists in a variety of forms, and the present invention may be implemented in such variety. The vast majority of software runs on individuals' desktop computers, such as those based on Intel Pentium IV or Motorola PowerPC processors. Another segment of tax preparation software is accessed via the World Wide Web. In this context, taxpayers visit a web site such as Intuit's "TurboTax for the Web" site, and prepare their taxes online, often for a fee. Another context in which the present invention can be implemented is the wireless communication device context, such as for use on a Personal Digital Assistant (PDA).

Figure 4:
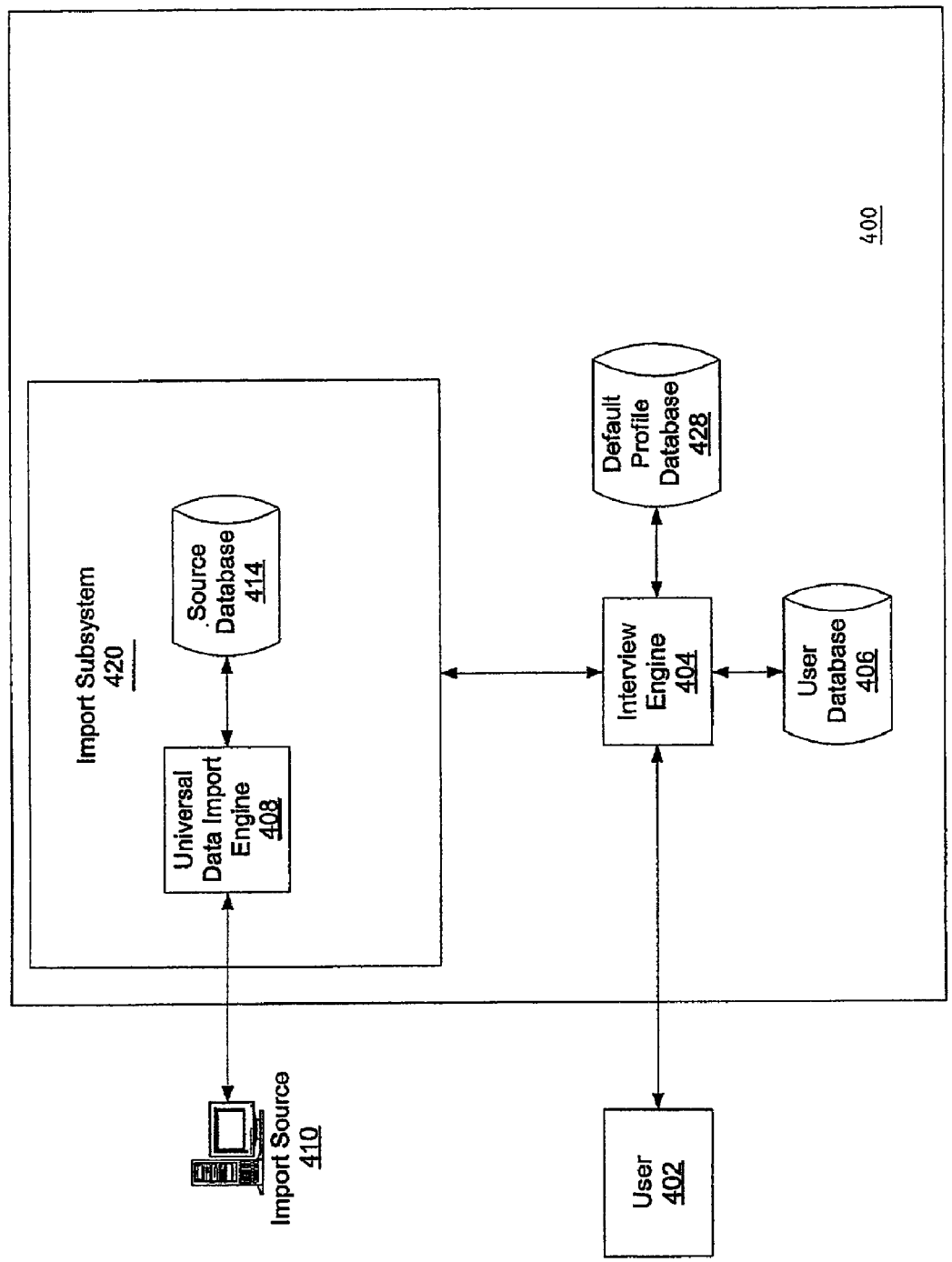
FIG. 4 is a block diagram of a system in accordance with an embodiment of the present invention.

Referring now to FIG. 4, there is shown a block diagram of an embodiment of a system of the present invention. System 400 includes an interview engine 404, user database 406, default profile database 428, import subsystem 420, further comprising Universal Data Import engine 408 and source database 414. Also depicted for illustrative purposes are user terminal 402 and import source 410.

System 400 provides functionality enabling ATR as described above with respect to FIG. 2. The operation and interrelationship of the modules of FIG. 4 are described below as part of the discussion of the UDI, interview and data retrieval sections.

System 400 may be implemented in various combinations of hardware and software, which may be resident on a user's desktop computer, or on a remote server, or on some combination of the two. The particular implementation of system 400, e.g. language, operating system, mobile design, communications protocols, etc., is not material.

Interview

Automated Tax Return incorporates an interview process based upon the practice of structuring tax preparation around each user's unique financial life or "profile." By adopting this approach in conjunction with the assumption that most users' tax situations change very little each year, users can complete their taxes more quickly and easily than is possible using conventional software.

Interview engine 404 preferably includes a user interface (UI) component for interacting with users 402 of system 400. In one embodiment, system 400 is implemented in desktop tax preparation software, and the UI of interview engine 404 is displayed when the software is started. In another embodiment, system 400 exists as part of a web service, and interview engine 404 comprises a plurality of web pages. Regardless of implementation, interview engine 404 communicates with user 402 to obtain and present data about the user relevant to the preparation of the user's tax return.

User database 406 allows for the storage of user records, including tax data retrieved for a user through UDI 206, and for data provided by the user herself. In one embodiment, user database 406 exists on a user's local computer system. In alternative embodiments, user database 406 maintains tax data for a plurality of users, and exists on a web server or other third party storage location.

Default profile database 428 stores several default profiles that can be assigned to new users when they begin the interview. While each user has a unique set of data, inferences can be made about the user's tax situation based on her status 306, as described below.

The structure of the interview itself approaches tax preparation from the perspective of users' personal/financial life, instead of IRS abstractions of income, deductions and credits.

Interview engine 404 approaches returning users from the perspective that change in the high-level structure of their tax return is unlikely or infrequent. The interview allows users to update items from a previous return by importing or manually entering information and then move on to items that users identify as having changed.

For new users, interview engine 404 helps build a profile that can be used to prepare their taxes year after year. System 400 uses multiple default profiles stored in the default profile database 428 and screening questions to develop tax profiles for new users as rapidly as possible. For example, in a preferred embodiment, older users with brokerage accounts start with a different default profile than 19 year old college students. Default profiles suggest responses typically appropriate for users of similar demographic types. These profiles are merely starting points, and actual profiles are customized as the users proceed through the interview.

Interview engine 404 avoids unnecessary portions of the interview. Once users indicate that a particular area does not apply to their tax situation, interview engine 404 does not ask about it again in future years unless the user indicates that some change in their status or financial relationships has occurred. In a preferred embodiment, a summary screen is presented to the user 402 containing a list of topics that have been skipped and offering the user a chance to revisit those topics, in order to ensure accurate returns.

The user tax profile contains information that allows interview engine 404 to be more effective at alerting users 402 to the tax implications of changes in their financial lives, and provides the foundation for providing helpful, proactive, year-round advice.

In a preferred embodiment, once the tax profile is constructed and stored in user profile database 406, it may be used by system 400 in various contexts, e.g. in desktop versions of system 400, on the web, etc.

The profile leverages user-entered data 204 and data obtained from Universal Data Import 206 to increase the simplicity of the interview by decreasing the number of interview questions that have to be answered by all users.

When system 400 is used by a new user, no personal profile information will be immediately available to system 400. Thus, interview engine 404 begins in a preferred embodiment by asking the user questions about the taxpayer, proceeding from questions that are more general to questions that are more specific. (In this description, the "user" and the "taxpayer" are assumed to be the same person. However, this need not be so—a taxpayer may authorize another person, such as a family member, accountant, etc. to assist the taxpayer with preparing her return. Nevertheless, for purposes of clarity we proceed on the assumption that the user and taxpayer are the same person. Where this assumption does not hold true, it does not affect the materiality of what is disclosed in this specification.)

Figure 5:
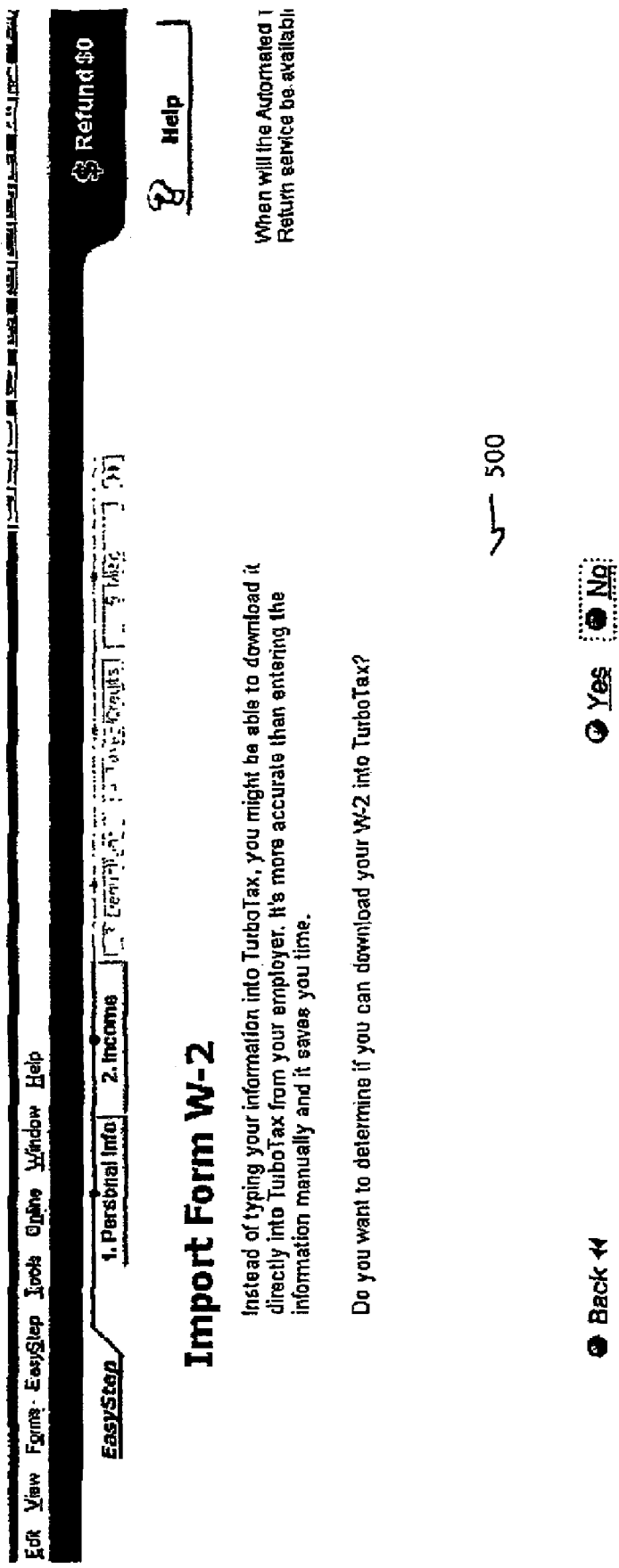

Referring now to FIG. 5, there is shown an illustration of a user interface page displayed by interview engine 404 as part of the interview process. In FIG. 5, the user is offered the opportunity to import Form W2 information electronically from an import source 410. In one embodiment the source for the W2 data is the taxpayer's payroll company. In alternative embodiments, the source may be the employer itself, or any other entity having data about the taxpayer.

Figure 6:
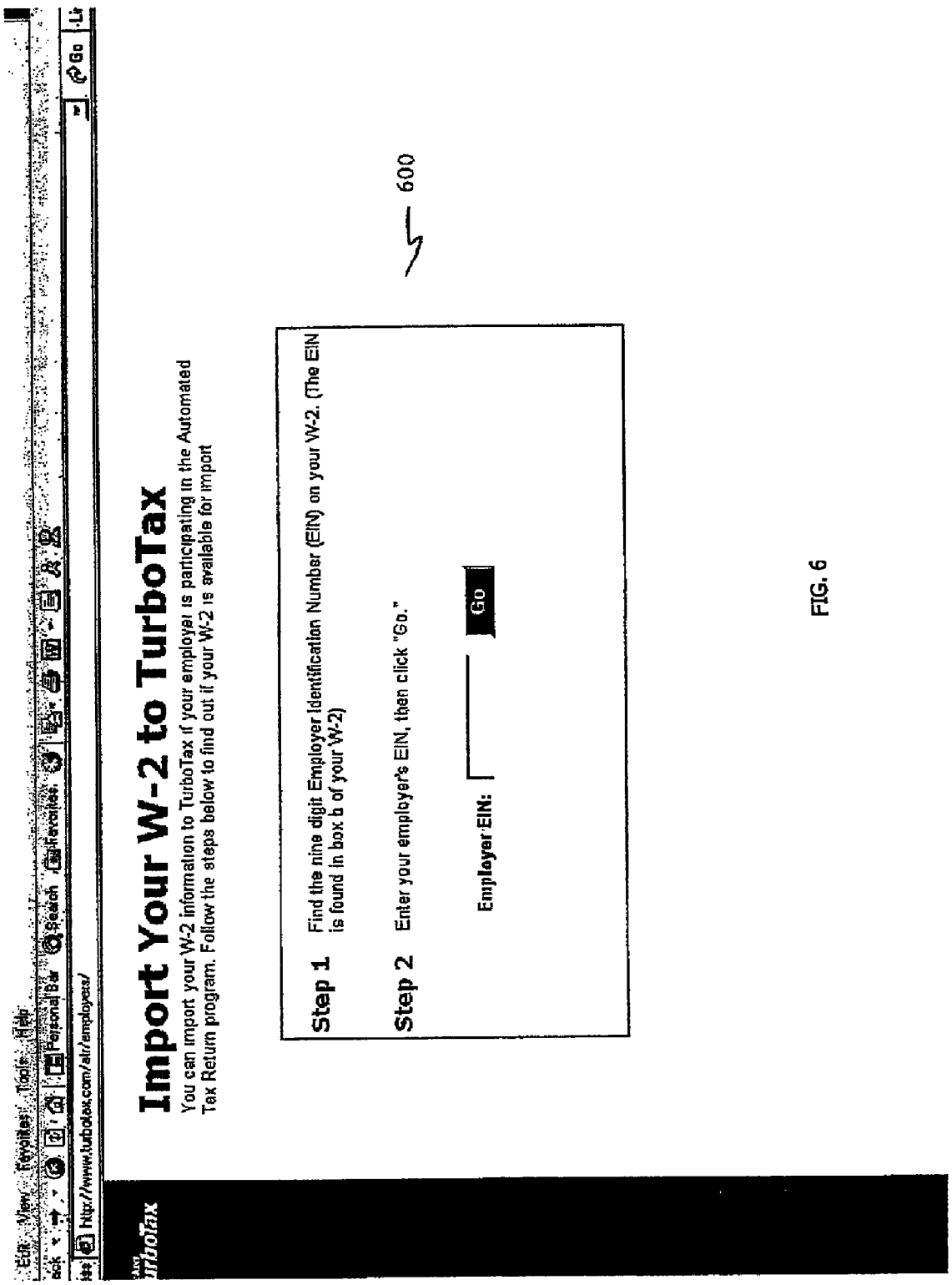

Referring now to FIG. 6, interview engine 404 helps the user to determine whether her tax data is available for import by using the Employer Identification Number (EIN) found on the user's Form W2. When user 402 provides the EIN, interview engine 404 passes the information to UDI engine 408, which then checks the source database 414 to determine whether the provided EIN corresponds to a valid import source 410.

At present, a small number of payroll companies are responsible for providing payroll services for a large percentage of employees. Employees and payroll companies alike are often concerned about employee tax privacy. System 400 addresses this concern by using the employer EIN as a primary check to see whether data for user 402 is available for import. Without using the EIN, either payroll companies would have to export lists of names or social security numbers to system 400, or system 400 would have to query every possible import source 410 in order to determine whether information was available for import about user 402. However, by exporting only a list of EINs to system 400, system 400 determines whether the EIN corresponds to a valid source 410, and thus provides identification and authentication data to only those sources 410 believed in advance to contain data about the user, thus reducing exposure of the user's private tax data.

Figure 7:
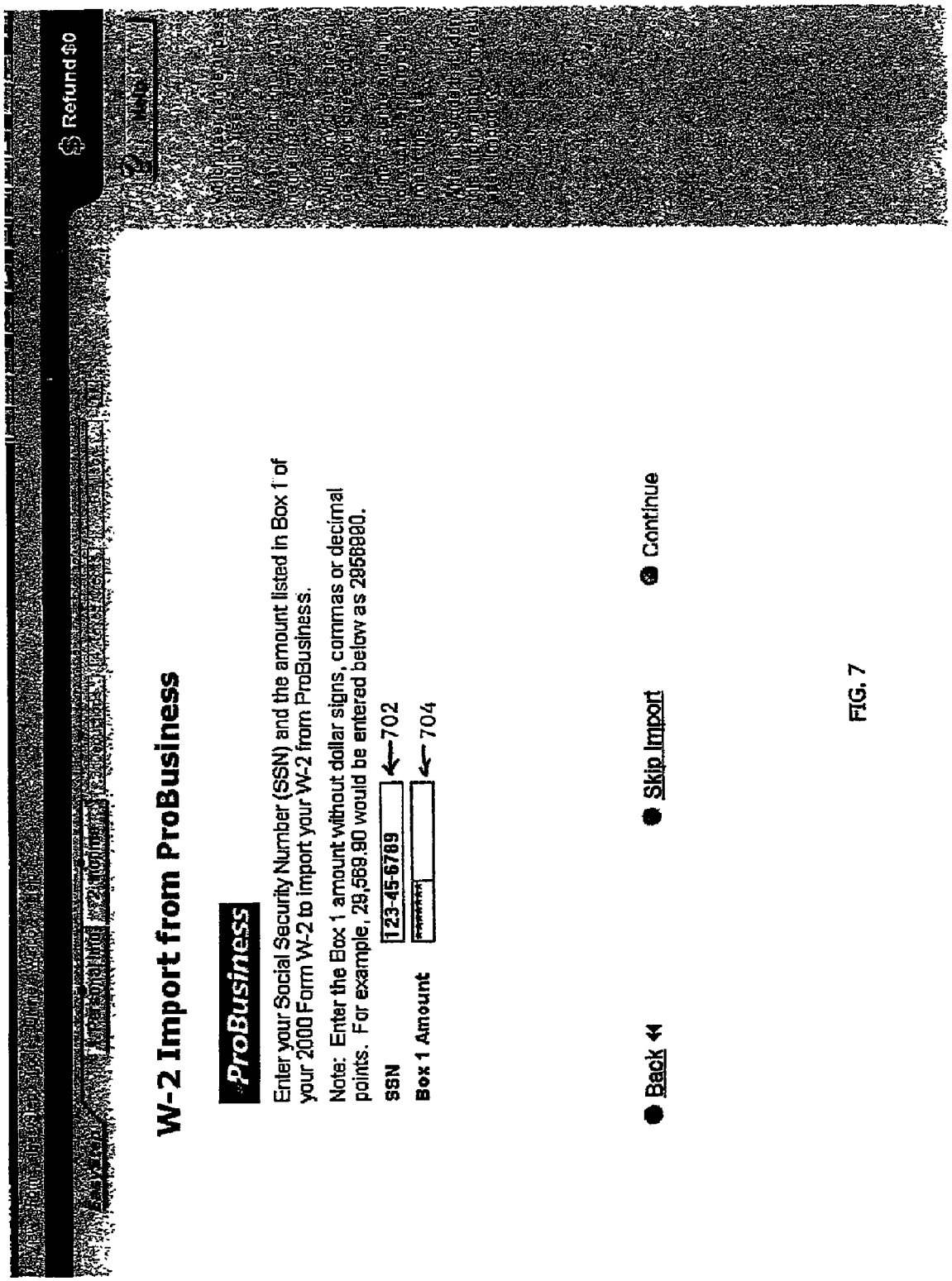

Next, and referring now to FIG. 7, the user provides identification information in order to retrieve importable data from import source 410. In order to ensure privacy and security, in one embodiment the user is required to provide both the user's social security number (SSN) 702 and the Box 1 Amount 704 found on the taxpayer's W2. Since the Box 1 Amount 704 will not generally be known to anyone other than the taxpayer and those whom he has authorized to retrieve the data, requiring the Box 1 Amount 704 as a security precaution provides an adequate method of protecting access to the taxpayer's private data. In alternative embodiments, other identifying data is used for authentication. For example, the taxpayer may already have a user ID and password directly with the import source, and the authentication scheme may ask the taxpayer to provide that information in order to import her data from the import source.

Figure 8:
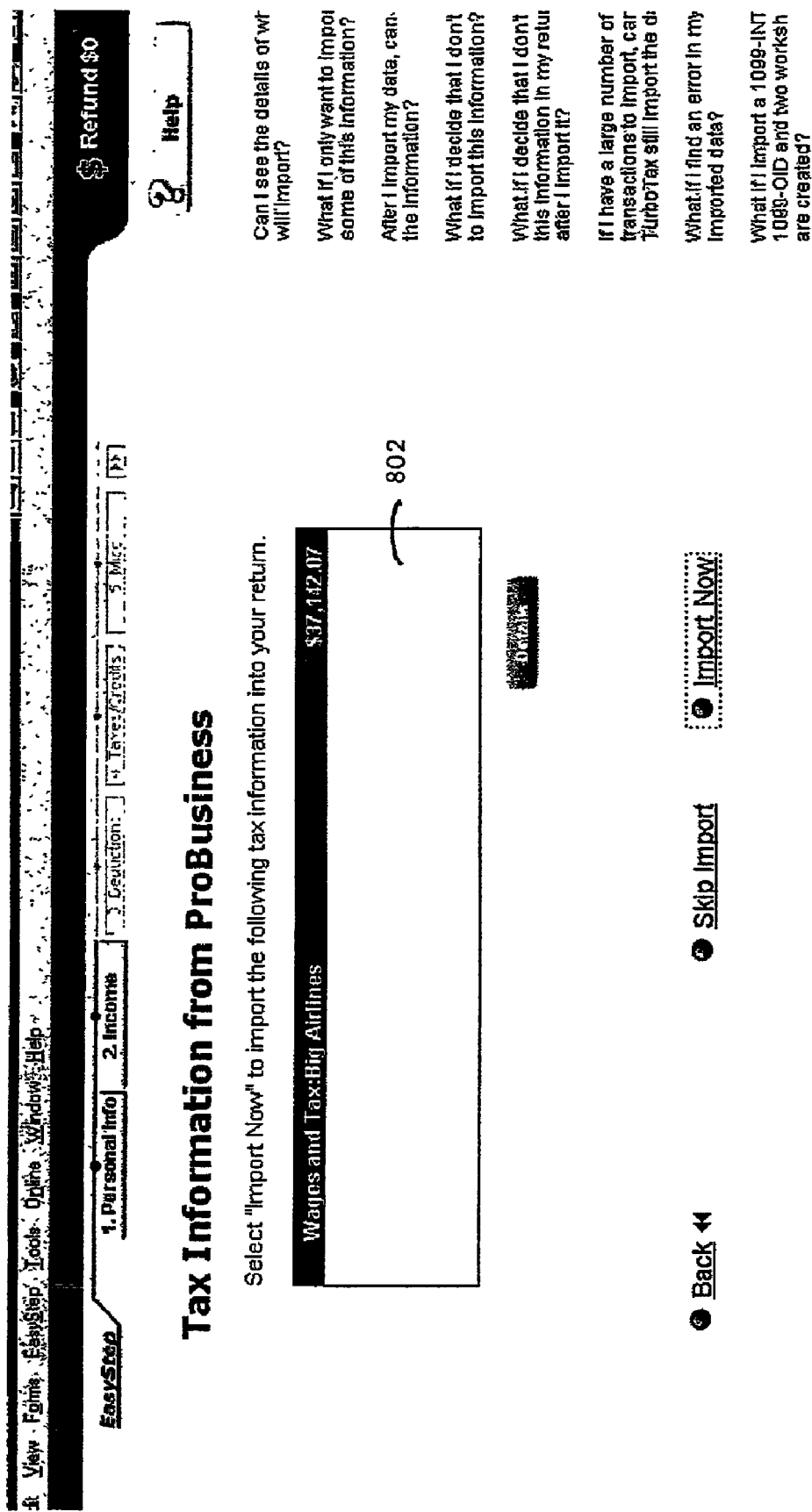

Referring now to FIG. 8, a list of available taxpayer data is provided to the user in window 802. In the illustrated embodiment, tax information from the financial institution "ProBusiness" includes Wages and Tax information from Big Airlines. Thus, in the illustrated embodiment, Big Airlines has employed the taxpayer and issued a W2, and the W2 is available for import from the import source 410 ProBusiness. FIG. 9 illustrates a detailed view of the imported W2 information listed in FIG. 8. In FIG. 10, a summary screen provides confirmation that the data was imported successfully.

It will be appreciated that while FIGS. 5-10 depict the import of W2 information, data for other tax forms, e.g. Form 1098, 1099, etc., is imported in a similar fashion in a preferred embodiment as the interview proceeds.

As data is imported, the import subsystem 420 recognizes imported data by source 410 and provides feedback to users 402 via interview engine 404 that indicates the level of completeness and accuracy of the imported data. For example, when users come across a transferred W2, interview engine 404 provides obvious visual clues for users to easily determine if they need to review imported data for accuracy or completeness. (See, e.g., FIGS. 9 and 10). Table 1 below provides examples of the user action required, given levels of completeness, the source of the data, and assumptions made about the accuracy of the data (based on its source):

TABLE 1

| Data Source | Level of completeness | Level of accuracy | User Action Required |
|---|---|---|---|
| Financial Institution | Complete | High | None |
| | Partially complete | High | Add missing items |
| Financial Management Software | Complete | High | None |
| | Partially complete | Moderate | Review |

Data gathered by UDI engine 408 is used to tailor the interview and eliminate unnecessary or redundant screens, ensuring that interview engine 404 does not ask user 402 questions that it already "knows" the answers to.

This data acquisition process allows the user 402 to select a source 410 from which to import some or all of the financial data that that source 410 has available. Note that a "source" 410 in this context is any financial institution or financial management software. The user 402 is made aware that she is importing data that corresponds to a particular financial term, but not necessarily which forms and fields will ultimately hold that data. For example, the user might import "Stock Sales" or "Tax Data From My Brokerage" without necessarily knowing that she is actually importing values that belong on IRS Schedule D. (For future reference, we refer to this collection of forms and fields as an "importable," and a set of data that maps to that collection as an "Importable instance.") The user can "drill down" on each importable instance and see to what data it maps.

The data acquisition process also allows the user to import the set of importables that is most appropriate given the user's current position in the interview process. (For future reference, this set of importables is referred to as the "import context.") In one embodiment, the interview engine 404 allows the user 402 to specify that the user would like to import all available importables (i.e. the import context is all importables) before the interview even begins. In another embodiment, the data acquisition process includes allowing a user 402 to import the importable that corresponds to the current form/field context being viewed.

The user 402 is presented with a dialog that displays all importable instances available from the chosen import source 410. If there are multiple importable instances for a particular importable, then each instance will be displayed as a separate "line item." In an alternative embodiment, all copies are rolled up into a single "line item." The format of each "line item" contains enough information about the data in that importable instance that the user is able to distinguish between similar importable instances.

Universal Data Import

The Universal Data Import component of system 400 is designed with simplicity for the new and seasoned user of tax preparation software in mind. It enables a user interface such as described above, that allows users to import data multiple times from multiple sources in the context of the relationship interview within the tax preparation software. Importing tax data as needed can be thought of as a "just-in-time" import. In a preferred embodiment, the amount of granularity and the frequency of the import is variable based upon the users' needs.

System 400 includes an import subsystem 420, responsible for importing data from external sources 410, such as financial institutions, financial management software, etc. The import subsystem 420 includes the Universal Data Import (UDI) engine 408 and the source database 414.

In a preferred embodiment, the UDI engine 408 handles data from the following sources:

a) Prior year tax preparation data files. Users can import prior year tax preparation data, either from a desktop version of the software, or a web-based version.

b) Multiple financial management software data files. Users with multiple data files can easily select parts of each data file to import into the tax preparation software. For example, if a user has a Quicken data file for his personal finances and a QuickBooks data file for his small business he can easily select Quicken data for Charitable Contributions and QuickBooks data for legal and professional expenses all with the click of a mouse.

i) The import process from financial management software follows a "copy and paste" approach, allowing users to import and edit data without unlinking category tax link assignments. Imported data and user entered data is editable in the same manner.

ii) Users can select unlinked data in financial management software. For example, a user might know that San Diego Zoo membership is tax deductible, but have it classified incorrectly in Quicken. He can select this transaction and bring it across quickly and easily.

Some examples of data types that can be imported in a preferred embodiment include: Forms W-2, Forms 1099-INT; Forms 1099-DIV; Forms 1099-B; Forms 1099-R; Forms 1099-OID; Forms 1099-MISC; and Forms 1098 (and associated impound account information).

To eliminate data redundancy, the UDI engine 408 selects what is likely to be the most reliable source of data for each item in the tax return automatically. For example, if users track W2 information in Quicken and also have W2 information available for import from a financial institution 306, UDI engine 408 automatically imports data from the financial institution 306, instead of from Quicken. Users are thus spared decisions that can be made automatically with a relatively high degree of accuracy. Other methods are also provided for users with exceptional situations to override recommendation and import from the source of their own choosing. Table 2 below provides some examples of primary and secondary sources for various information in accordance with an embodiment of the present invention.

TABLE 2

| Description | Primary Source | Secondary Source |
| --- | --- | --- |
| Names, address, phone, occupation | Transfer | User Entered |
| Dependent information | Transfer | User Entered |
| Wages (Form W-2) | Financial Institution | Financial Management Software |
| Interest Income (Form 1099-INT) | Financial Institution | Financial Management Software |
| Dividend Income (Form 1099-DIV) | Financial Institution | Financial Management Software |
| Stock Sales (Form 1099-B) | Financial Institution | Financial Management Software |
| Mortgage Interest Payments (Form 1098) | Financial Institution | Financial Management Software |
| Vehicle Registration Fees | Financial Management Software | User Entered |
| Charitable Contributions | Financial Management Software | User Entered |
| Medical Expenses | Financial Management Software | User Entered |
| Dependent Care Expenses | Financial Management Software | User Entered |

In this fashion, the UDI engine 408 gathers and presents information from the user's perspective. Again, references to forms and tax line assignments are made available, for those who want to "drill down" and manipulate their data.

In a preferred embodiment, as users proceed through the interview, system 400 seamlessly gathers data from a variety of sources using the Universal Data Import engine 408. In alternative embodiments, UDI 206 occurs at a single point in the interview, which may assist users with limited network access or bandwidth.

The UDI engine 408 is responsible for at least three functions in a preferred embodiment: data acquisition, data reconciliation, and data manipulation.

The UDI engine 408 data acquisition process, referred to above with respect to the interview, supports import from different types of sources. A first source type is an accounting software source type, and it includes sources like Quicken, QuickBooks, and other financial management software programs. A second source type includes third party data providers, i.e. financial institutions. Note that these source types can have "subtypes"—for instance, a financial institution may have one of the following subtypes: banks/brokerages, or payroll services. Other sources may be available in alternative embodiments, as described below with respect to import mapping.

Once the user has selected an import source 410, system 400 presents a user interface for acquiring data from that source. An example of such a user interface is described above with reference to FIGS. 5-10. In other embodiments, the user interface may include an Open File dialogue, or a dialogue where the user can enter her account and password for that institution. Note that this UI may vary by platform, source type/subtype and even source instance.

Once the data acquisition phase has been completed, system 400 enters the data reconciliation phase of the import process.

The data reconciliation process allows the user 402 to reconcile data that is available from a source 410 both with itself and with data that has already been either input or imported. This process occurs in one embodiment immediately after the data acquisition phase, at which point system 400 has determined what information is available for import from the chosen source 410.

The user 402 can select via the user interface which importable instances to import (or exclude). In a preferred embodiment, the data reconciliation process imports all importables that correspond to the current import context, and excludes the rest. If an importable has all of its instances rolled up into a single "line item", then the user can import all or none of the instances. If a "line item" in the reconciliation dialog represents a set of data that maps to a form/record/field that already exists, then the user is made aware of this. If the data maps to a multiple copy form or record, then the user is made aware of which multiple copy form or record to which it maps.

Where a conflict exists between data being imported and data already entered, in a preferred embodiment the user 402 is given the opportunity to resolve conflicts prior to the import.

Data manipulation refers to the process by which the user can manipulate data after it has been imported. For example, the user can delete an importable instance, and all data from an import source. The user can examine a field on a form and see whether it was imported. If the field was imported, then the user is able to see from which importable source it came. The user can also edit an imported field in the same way as a user-entered field.

Import Mapping

Figure 11:
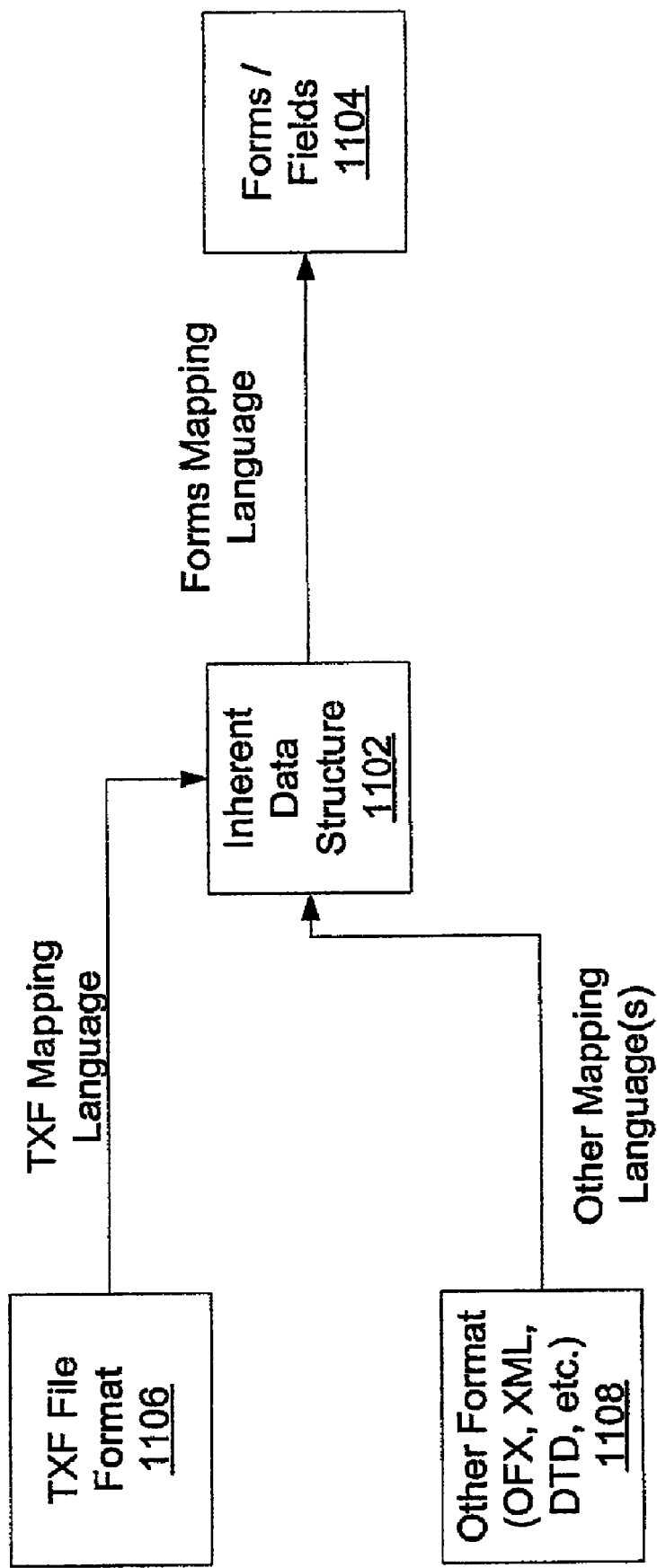
FIG. 11 is a diagram depicting the mapping of import data in accordance with an embodiment of the present invention.

Import mapping describes the path of imported data from the import source into the user's tax return. In one embodiment, and referring now to FIG. 11, support is provided for the import of data stored in multiple formats. In order to achieve this support, a standard is provided for an inherent data structure 1102. This inherent data structure 1102 language is independent of forms and file formats, and maps data into appropriate forms and fields 1104 of various tax forms, in order to prepare a tax return. Since data can be stored in various formats, e.g. Tax Exchange Format (TXF), Open Financial Exchange (OFX), Extensible Markup Language (XML), Document Type Definition (DTD), etc., additional mappings and conversion algorithms may be used in order to convert the stored data into the inherent data structure 1102. Thus, by making the inherent data structure 1102 available to import sources 410 such as financial institutions and financial management software authors, it is possible for system 400 to accept data from a wide range of sources in order to perform import of tax data. A new format merely requires a new mapping from that format into the inherent data structure 1102. The mapping from the inherent data structure to the forms 1104 is unaffected. Furthermore, an import user interface can be built around the inherent data structure so that it is independent of the format of the import data.

The inherent data structure language 1102 defines the importable records and values, and the inherent structure of importable data. That is, the depictions of importable data independent of its representation either on forms or in a format such as the public ".TXF" format. In one embodiment, the importable language includes support for the following features:

Representing a value

Representing a group of values

Associating an ID with a group of values.

Representing a group of values as a child of another group of values

Representing a group of values or a value that there can be only one of (single cardinality)

Representing a group of values or a value that there can be many instances of (multiple cardinality)

Representing an instance of a group of values or value with a dynamic text representation. This text representation may contain values from the group of values or value as well as the quantity of child groups of values or values.

By way of example, in one embodiment a TXF mapping language maps the TXF format 1106 into the inherent data structure 1102. It utilizes the records and fields available in the TXF format to fill in an instance of the inherent data structure. In one embodiment, the TXF Mapping Language includes support for the following features:

Collating TXF transactions based upon a set of keys (including constants)

Separating TXF transactions

Creating unique inherent data instances for every TXF transaction

Utilizing information from the TXF detail record if it exists

Assigning data such as class and company name from financial management software to inherent data values Conditionally assigning inherent data values based upon the presence of a field in the TXF record.

Conditionally assigning inherent data values based upon data ranges of the TXF record.

Assigning constant values to inherent data values

The forms mapping language maps the inherent data structure 1102 into forms and fields. In one embodiment, the two data structures have in common the representation of single cardinality and multiple cardinality values and records. This language bridges the gap and allows the movement of the inherent data structure into the forms and fields of the user's return. The forms mapping language includes support for the following features in a preferred embodiment:

Associating a single instance value with a single field. By implication, this action replaces any data on that single field. This is a one to one mapping.

Associating a group of single instance values with a group of fields (potentially on different forms). This is really a one to one mapping as well where an importable instance contains more than one value that all go to specific places. By implication, the values on the fields are replaced by the imported values.

Associating a multiple instance value with a single field. By implication, this action replaces any data on that single field. This is a many to one mapping.

Associating a multiple instance value with a set of fields on a form. This is a many to many mapping. Many to many mappings allow data on the forms to co-exist with imported data. As such, the import does not imply the replacement of data.

Associating a multiple instance value with an array on a form. This is a many to many mapping.

Associating a multiple instance group of values with a set of fields. This is a many to many mapping.

Associating a multiple instance group of values with a set of arrays. This is a many to many mapping.

Associating a multiple instance group of values with a table. This is a many to many mapping.

Source Data Base

Source database 414 is populated with financial institutions' 306 names and associated information. The information stored varies according to implementation, but in general provides functionality equivalent to that listed below. The source database 414 in one embodiment is keyed by a source name. The source name may differ from the name of the financial institution as it is displayed in various user interfaces, as appropriate to suit the underlying programming architecture.

In one embodiments, the UDI engine 408 accesses the information in the source database 414, in order to obtain the following data:

QueryPartners: a list of source names that satisfy given criteria. In one embodiment, there are three levels of criteria, including:

Source Type: This is the type of financial institution the engine is looking for, e.g. banks, brokers, payroll services, accounting software, or all.

Supporting Importables: This is a list of importable IDs. It represents the type of data to be acquired from the financial institution.

Overwrite Attribute: For each importable, there is a Boolean value indicating the appropriate behavior when imported data conflicts with data already present.

QueryPartnerName: Returns the financial institution's name suitable for display in the user interface given the financial institution's source name.

QueryPartnerIcon: Returns an icon that represents the source 410. If the import source 410 does not provide such an icon, a default import icon is used for this import source 410.

QueryAcqusitionScreen: Returns the acquisition screen relevant to the input source specified by the source name. This method may return a FALSE value to indicate there no data acquisition screen for this import source. This function will also return whether the import source is an asynchronous financial institution. In one embodiment, the acquisition screen includes the following:

Explanatory Text: This is a block of text to explain what the user needs to do. This information is specific to the import source. For example, "Enter the user ID and password you received in the mail."

Authentication Fields: This is an array of field names used to authenticate the user.

Password Field: the name to be used for the password field.

Bitmap Logo: a bitmap logo displayed below the authentication fields.

In one embodiment, C++ code is used by import engine 408 to acquire data from the import source 410. In one embodiment, data is acquired by specifying a source name (i.e. the name of the financial institution), authentication data, and connection information specifying how the data should be returned.

After the UDI engine 408 retrieves data form the import source, it extracts relevant information, including the format of the data, and the data itself. If the data format is not valid, an error is generated, and system 400 displays the error text to the user and aborts the import process.

Step By Step Method of Interview with UDI

Figure 12:
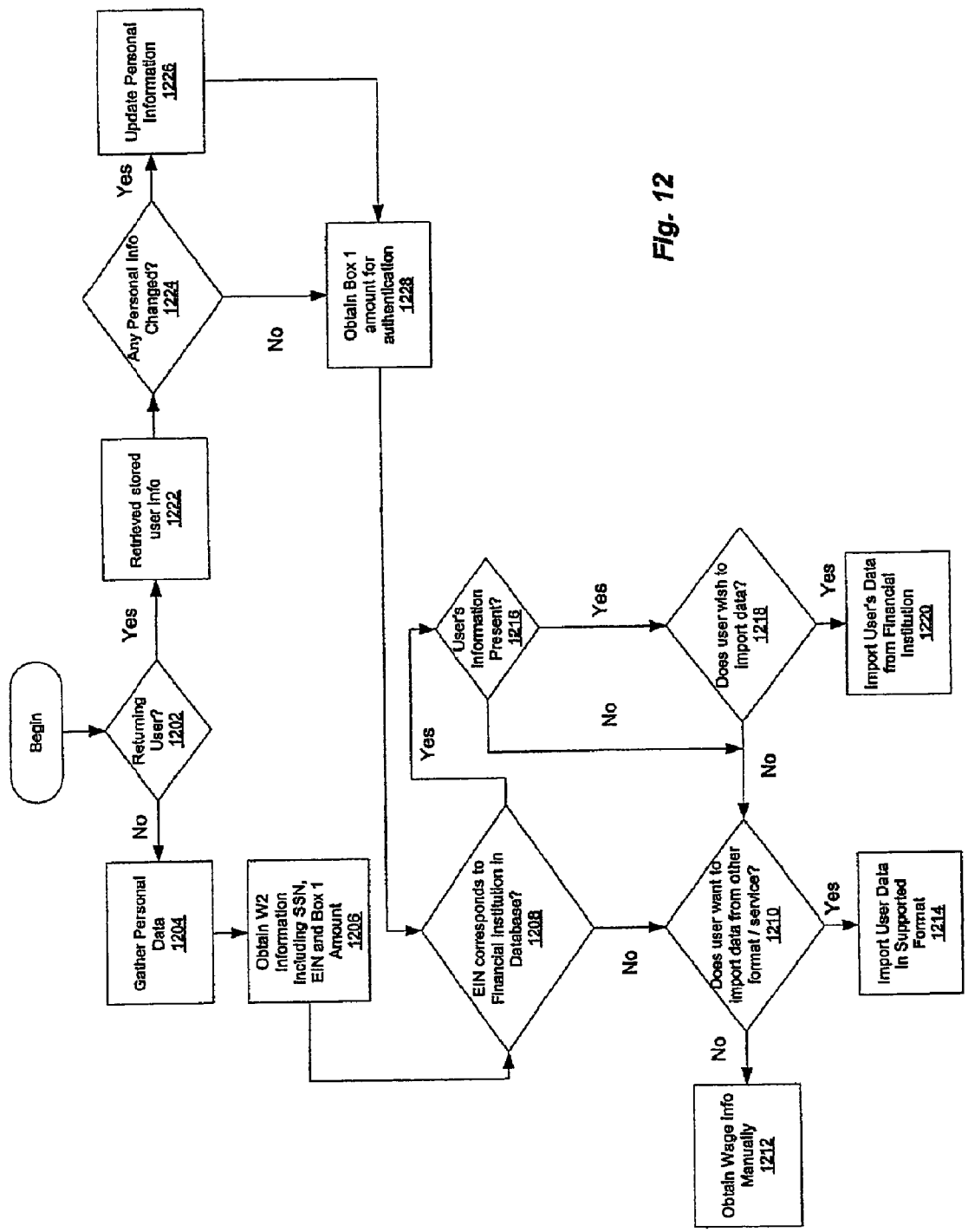
FIG. 12 is a flowchart illustrating a method of importing tax data in accordance with an embodiment of the present invention.

Referring now to FIG. 12, there is shown a flow chart illustrating the UDI 206 process in accordance with one embodiment of the present invention. A user 402 is first identified 1202 as either a new user or a returning user. A returning user is someone for whom a record exists in user database 406. In a preferred embodiment, a user's record includes at least the user's name and social security number. In alternative embodiments, identifying data is stored in the user record. If it is determined in step 1202 that the user is a new user, then the interview engine 404 gathers 1204 personal data from the user 402, and combines the gathered information with a default profile from default profile database 428. As described above, the personal data may include, for example, name, address, number of dependents, etc. In addition, the taxpayer's social security number, and data from the taxpayer's W2 are obtained 1206. In a preferred embodiment, data from the W2 includes the employer identification number (EIN), and the "Box 1 Amount" from the W2. As described above, UDI import engine 408 determines 1208 whether the EIN provided corresponds to an import source 410 in the source database 414. If the taxpayer's information is present 1216, then the user is asked whether the data should be imported 1218. If the user agrees, then the data is imported 1220 from the source. If the taxpayer's information is not present 1216, or if the user determines that it should not be imported 1218, then the user is offered 1210 the opportunity to import the data from another format or to use another service to obtain the data. Similarly, if the EIN from the W2 does not map to a valid source 1208, the user is offered 1210 the same choice of importing data from another format or service. If the user chooses to import the data from another format or service, it is imported 1214. Otherwise, the user inputs the wage information manually 1212.

Still referring to FIG. 12, if the user is a returning user 1202, the user's stored personal information is retrieved 1222 from user database 406, and presented to the user. If the user has any changes to make to the displayed information 1224, then she updates it 1226. Next, the Box 1 Amount is obtained 1228, and the process proceeds from step 1208 as described above.

When a user's tax return is prepared, and at various times throughout the interview and UDI process, a user's information is written to user database 406. This ensures both that the user's data will be available in future years to assist with the preparation of tax returns, and also that should the user become disconnected from system 400 (either voluntarily or accidentally), she can resume the ATR process upon her return.

Automatic Tax Preparation

Figure 13:
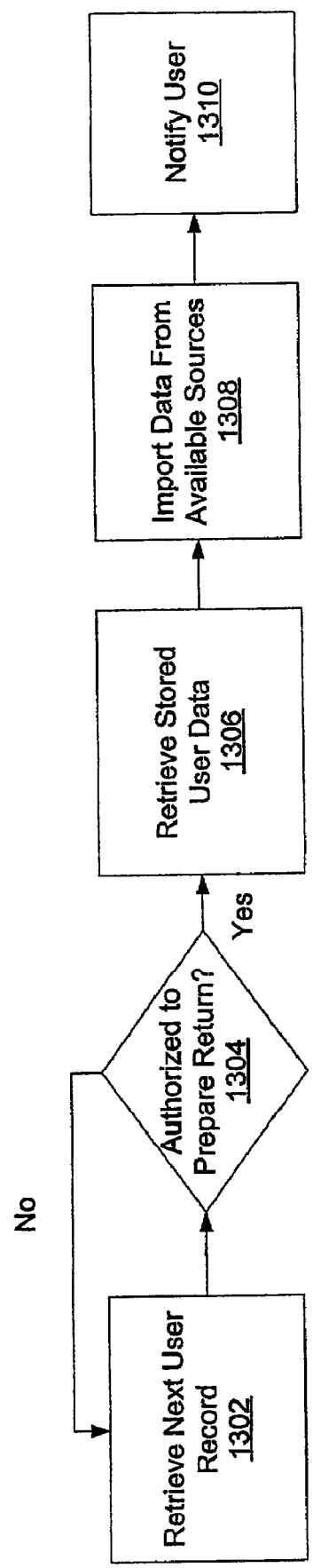
FIG. 13 is a flowchart illustrating a method of preparing tax returns automatically in accordance with an embodiment of the present invention.

One advantage of ATR is that it enables the automatic preparation of a taxpayer's return, in a preferred embodiment requiring little or no user input. Referring now to FIG. 13, there is shown an illustration of the automatic preparation of a taxpayer's return. System 400 retrieves 1302 a first or next record from the user database 406. For purposes of maintaining privacy, the user record includes indicia of whether system 400 is authorized to attempt to prepare the user's return. If system 400 is not authorized 1304 to prepare the user's return, then system 400 retrieves 1302 the next record available. If system 400 is authorized 1304 to attempt to prepare the user's return, then the complete data record is retrieved 1306 for that user from the user database 406. Using the methods and processes described above with respect to UDI 206, all available taxpayer information is retrieved 1308 from available sources. This results in a degree of preparation of the user's tax return that may range anywhere from basic information only to a complete tax return, depending on the availability of data to be imported. Once system 400 has prepared as much of the taxpayer's return as possible without additional information, the user is notified 1310 that a return is partially (or completely) ready for review and editing. In one embodiment, the user is notified by e-mail, but in other embodiments the user is notified by telephone, television, wireless communication device, etc. When the user accesses system 400, she is shown a summary of the information collected, and is prompted for any missing information necessary to complete an accurate return. Once any missing information has been provided and the user has verified the accuracy of the complete return, it can be printed and submitted, or filed electronically. It will be evident to those of skill in the art that using the process described herein, the burden on the taxpayer of preparing a tax return year after year is greatly reduced.

The foregoing discloses exemplary methods and embodiments of the present invention. It will be understood that the invention may be embodied in other forms and variations without departing from the spirit or scope of the invention. Accordingly, this disclosure of the present invention is illustrative, but not limiting, of the invention, the scope of which is defined by the following claims.

The invention claimed is:

1. A system for preparing a tax return for a taxpayer using an interview, comprising:
  a user database for storing taxpayer data;
  an import subsystem for electronically importing tax data related to the taxpayer from a plurality of input sources via a communications network, the import subsystem comprising:
    a universal data import engine for communicating electronically with the plurality of import sources and retrieving a tax data item from the plurality of import sources, wherein the tax data item is retrieved during the interview; and
    a source database, coupled to the universal data import engine, for storing information associated with the plurality of import sources indicative of the tax data item provided by each of the plurality of import sources;
  a default profile database comprising a plurality of default profiles and a plurality of interview questions,
    wherein a default profile of the plurality of default profiles comprises suggested responses based on demographics of the taxpayer, and
    wherein the plurality of interview questions are based on a financial life of the taxpayer; and
  an interview engine operatively connected to the user database, the import subsystem, and the default profile database, for conducting the interview and configured to:
    obtain the plurality of interview questions,
    decrease the plurality of interview questions based on suggested responses of the default profile by skipping a first question,
    decrease the plurality of interview questions based on the tax data item retrieved from the plurality of import sources by skipping a second question, and
    prompt the plurality of interview questions in order to complete a portion of the tax return, wherein the first and second question are excluded.

2. A computer program product comprising: a computer-readable medium having software instructions embodied therein for preparing a tax return for a taxpayer using an interview, the software instructions comprising functionality to implement:
  a user database for storing taxpayer data;
  an import subsystem for electronically importing tax data related to the taxpayer from a plurality of input sources via a communications network, the import subsystem comprising:
    a universal data import engine for communicating electronically with the plurality of import sources and retrieving a tax data item from the plurality of import sources, wherein the tax data item is retrieved during the interview; and
    a source database, coupled to the universal data import engine, for storing information associated with the plurality of import sources indicative of the tax data item provided by each of the plurality of import sources;
  a default profile database comprising a plurality of default profiles and a plurality of interview questions,
    wherein a default profile of the plurality of default profiles comprises suggested responses based on demographics of the taxpayer, and
    wherein the plurality of interview questions are based on a financial life of the taxpayer; and
  an interview engine operatively connected to the user database, the import subsystem, and the default profile database, for conducting the interview and configured to:
    obtain the plurality of interview questions,
    decrease the plurality of interview questions based on the suggested responses of the default profile by skipping a first question,
    decrease the plurality of interview questions based on the tax data item retrieved from the plurality of import sources by skipping a second question, and
    prompt the plurality of interview questions in order to complete a portion of the tax return, wherein the first and second question are excluded.

3. A computer program product for preparing a tax return for a taxpayer using an interview, the computer program product stored on a computer-readable medium and including program code to cause a computer system to carry out the steps of:
  obtaining identification data comprising an employer identification number (EIN) of a taxpayer's employer associated with a tax form;
  determining, via communication over a communications network with a tax data provider associated with the taxpayer's employer, using the employer identification number (EIN) that tax data about the taxpayer is available from the tax data provider;
subsequently, providing taxpayer authentication data to the tax data provider;
retrieving, from the tax data provider, the tax data about the taxpayer, wherein the tax data is retrieved during the interview;
obtaining a plurality of interview questions, wherein the plurality of interview questions are based on a financial life of the taxpayer;
decreasing the plurality of interview questions based on the suggested responses of the default profile by skipping a first question;
decreasing the plurality of interview questions based on the tax data retrieved from the tax data provider by skipping a second question;
prompting the plurality of interview questions in order to complete a portion of a tax return, wherein the first and second question are excluded; and
preparing the tax return for the taxpayer using the retrieved tax data and the data received from the plurality of interview questions.

4. The computer program product of claim 3, wherein the employer identification number (EIN) is obtained from a W2 form associated with the taxpayer.

5. The computer program product of claim 3, wherein determining that tax data about the taxpayer is available comprises:
querying a plurality of tax data providers with the identification data to determine which of the tax data providers are associated with the taxpayer's employer.

6. The computer program product of claim 3, wherein determining that tax data about the taxpayer is available comprises:
identifying a plurality of employers providing tax data electronically; and
determining, using the identification data identifying the taxpayer's employer, whether the taxpayer's employer provides tax data electronically.

7. The computer program product of claim 3, further comprising:
electronically filing the tax return with a taxing authority.

8. The computer program product of claim 3, wherein the tax data provider is selected from a plurality of tax data providers based on a reliability of the tax data provider.

9. The computer program product of claim 3, wherein the program code further causes the computer system to carry out the step of:
determining whether the employer identification number (EIN) corresponds to an import source.

10. The computer program product of claim 3, wherein the program code further causes the computer system to carry out the step of:
indicating from where the tax data is retrieved.

11. The computer program product of claim 3, wherein preparing the tax return comprises using a default profile that suggests responses based on the taxpayer.

12. The computer program product of claim 2, wherein the employer identification number (EIN) is obtained from a W2 form associated with the taxpayer.

13. The system of claim 1, wherein the plurality of import sources are associated with an employer identification number (EIN) associated with a tax form.

14. The system of claim 13, wherein the source database is queried with the employer identification number (EIN).

15. The system of claim 13, wherein the employer identification number (EIN) is obtained from a W2 form associated with the taxpayer.

16. The computer program product of claim 2, wherein the plurality of import sources are associated with an employer identification number (EIN) associated with a tax form.

17. The computer program product of claim 16, wherein the employer identification number (EIN) is obtained from a W2 form associated with the taxpayer.

* * * * *

UNITED STATES PATENT AND TRADEMARK OFFICE
CERTIFICATE OF CORRECTION

| | | |
|---|---|---|
| PATENT NO. | : 7,747,484 B2 | Page 1 of 1 |
| APPLICATION NO. | : 11/278945 | |
| DATED | : June 29, 2010 | |
| INVENTOR(S) | : Todd Stanley et al. | |

It is certified that error appears in the above-identified patent and that said Letters Patent is hereby corrected as shown below:

On the Title Sheet:

Under Section (75) Inventors, line 2, the Inventor's name "Devin Breise" should read --Devin W. Breise--.

In the Claims:

In Claim 1, Column 16, lines 7-8, the word --the-- is erroneously missing.

Signed and Sealed this

Twenty-fourth Day of August, 2010

David J. Kappos
*Director of the United States Patent and Trademark Office*